US012078114B1

(12) United States Patent
Srinivas et al.

(10) Patent No.: US 12,078,114 B1
(45) Date of Patent: Sep. 3, 2024

(54) ELECTRONIC TURBINE AND ENGINE PHASER FOR REDUCTION OF COLD START EMISSION AND NOISE VIBRATION AND HARSHNESS

(71) Applicant: FCA US LLC, Auburn Hills, MI (US)

(72) Inventors: Pavan Kumar Mukkara Srinivas, Troy, MI (US); Ronald A Reese, II, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/476,503

(22) Filed: Sep. 28, 2023

(51) Int. Cl.
*F02D 13/02* (2006.01)
*F02D 41/00* (2006.01)
*F02D 41/06* (2006.01)

(52) U.S. Cl.
CPC ..... *F02D 13/0215* (2013.01); *F02D 41/0007* (2013.01); *F02D 41/064* (2013.01); *F02D 2200/0406* (2013.01)

(58) Field of Classification Search
CPC ............... F02D 13/0215; F02D 41/064; F02D 2200/0406; F02B 37/10
See application file for complete search history.

(56) References Cited

FOREIGN PATENT DOCUMENTS

CN 106438056 B * 8/2021 ......... F02D 13/0215

* cited by examiner

*Primary Examiner* — Ngoc T Nguyen
(74) *Attorney, Agent, or Firm* — Jeremy J. Klobucar

(57) ABSTRACT

An engine system that delivers torque to a driveline of a vehicle includes an internal combustion engine (ICE), a manifold, an engine phaser (ePhaser), an electric turbine (eTurbine) and a controller. The ICE includes intake valves and exhaust valves. The ePhaser is configured to adjust timing of the intake and exhaust valves. The eTurbine is driven by an electric motor and is configured to deliver air toward and away from the manifold. The controller determines an ICE start request and, sends a signal to the ePhaser to open identified valves of the intake valves and the exhaust valves creating a pathway through the ICE. The controller further sends a signal to the electric motor to rotate the eTurbine in a direction that moves air out of the manifold. The eTurbine is used to deplete air in the manifold before starting the ICE and reduce emissions at startup.

13 Claims, 3 Drawing Sheets

ELECTRONIC TURBINE AND ENGINE PHASER FOR REDUCTION OF COLD START EMISSION AND NOISE VIBRATION AND HARSHNESS

FIELD

The present application generally relates to cold start emissions of internal combustion engines and, more particularly, to a system and method to reduce cold start emissions as well as noise, vibration and harshness.

BACKGROUND

The majority of emissions are produced during cold start of an internal combustion engine (ICE) where the catalyst has yet to reach preferred operating temperature. Airflow rate of the ICE during a cold start in both conventional and hybrid start is more than what is needed because the manifold pressure is at ambient pressure at the initial start. More airflow corresponds to more fuel being burned and hence more emissions being created. Further, excess airflow also causes higher noise vibration and harshness (NVH) to be created in the powertrain and experienced by the driver.

Existing solutions to reduce emissions at during a cold start-up of and ICE can incorporate variable lift camshafts with small lift to reduce the amount of airflow going into the cylinder. In general, such technology and implementation is expensive. Accordingly, while some cold start emissions systems do work well for their intended purpose, there exists an opportunity for improvement in the relevant art.

SUMMARY

According to one example aspect of the invention, an engine system that delivers torque to a driveline of a vehicle includes an internal combustion engine (ICE), a manifold, an electromechanical or electronic cam phaser (ePhaser), an electric turbine (eTurbine) and a controller. The ICE includes intake valves and exhaust valves. The manifold selectively communicates air into the ICE. The ePhaser is configured to adjust timing of the intake and exhaust valves. The eTurbine is driven by an electric motor and is configured to deliver air toward and away from the manifold. The controller determines an ICE start request and, based on the ICE start request, sends a signal to the ePhaser to open identified valves of the intake valves and the exhaust valves creating a pathway through the ICE. The controller further sends a signal to the electric motor to rotate the eTurbine in a direction that moves air out of the manifold.

In some implementations, the controller is further configured to receive a signal from a manifold pressure sensor indicative of a measured pressure in the manifold. The controller is further configured to determine whether the manifold pressure has reached a threshold pressure and stop rotation of the eTurbine based on reaching the threshold pressure.

According to another example aspect of the invention, the engine system further comprises a throttle that moves between an open position that allows air to be directed into and out of the manifold, and a closed position that inhibits air from being directed into and out of the manifold.

In some implementations, the controller is further configured to send a signal to the throttle, based on the ICE start request, to move the throttle to the closed position.

In other implementations, the controller is further configured to send a signal to the eTurbine, based on reaching the threshold pressure, to turn off the eTurbine.

In additional implementations, the controller is further configured to send a signal to the ePhaser based on reaching the threshold pressure, to return the intake and exhaust valves to a starting position.

In additional implementations, the controller is further configured to send a signal to the ICE to crank the ICE, subsequent to turning off the e Turbine.

In other implementations, the engine system further comprises a compressor, wherein the electric motor rotates a shaft associated with the compressor and the turbine.

In examples, the electric motor and the compressor comprise an electric compressor.

A method of operating an engine system that delivers torque to a driveline of a vehicle is provided. A start request in an engine system having an internal combustion engine (ICE) is received. A signal is sent, based on receiving the start request, to an engine phaser to open identified intake and exhaust valves creating a pathway through the ICE. A signal is sent, based on receiving the start request, to an electric motor to rotate a turbine to move air in a direction out of the manifold thereby creating a vacuum through the pathway in the ICE and moving air out of the manifold.

A signal is received from a manifold air pressure (MAP) sensor indicative of a measured pressure in the manifold. A determination is made whether the measured pressure in the manifold satisfies a threshold, the threshold corresponding to a reduced pressure in the manifold suitable to reduce emissions at startup of the ICE. A signal is sent to the electric motor to stop rotating the eTurbine based on the measured pressure satisfying the threshold. A signal is sent to the ePhaser to return the intake and exhaust valves to a start position. A signal is sent, based on the measured pressure satisfying the threshold, to the engine system to crank the ICE.

In additional arrangements, a signal is sent to a throttle, based on receiving the start request, causing the throttle to move to a closed position.

According to another example aspect of the invention, a signal is sent to an electric motor to rotate the eTurbine comprises rotating a shaft with the electric motor causing the eTurbine to rotate.

In some implementations, sending a signal to an electric motor to rotate an e Turbine to move air in a direction out of the manifold comprises moving air from the manifold, through the ICE and out of an exhaust.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, there exists an opportunity for improvement in the art of cold start emissions of internal combustion engines. As is known, the majority of emissions are produced during cold start of an ICE where the catalyst has yet to reach preferred operating temperatures. The airflow rate of the ICE during a start in both conventional and hybrid start is more than what is needed because the manifold pressure is at ambient pressure at the initial start. More airflow corresponds to more fuel being burned and therefore more unwanted emissions. Further, excess airflow also causes higher noise vibration and harshness.

The present disclosure provides an engine system that incorporates an eTurbine and ePhaser that are used to deplete the manifold before starting the ICE. When an engine start is requested, and before cranking, the ePhaser is used to create an overlap of valve timing while the eTurbine is rotated using an electric motor of the eTurbine. The overlap in valve timing creates a pathway for engine air to go from an intake valve to an exhaust valve. Rotating the eTurbine results in a vacuum pump drawing the air out of the manifold and plumbing through the cylinders and exhaust system. The throttle is kept fully closed during the flushing operation. The amount of air drawn out is monitored using a manifold pressure sensor. Once the manifold pressure reaches a desired threshold, the eTurbine is turned off or brought back to zero revolutions. Thereafter, normal cranking sequence of the ICE starts. Because of the reduction of air in the manifold, less fuel is used and therefore less emissions are created.

Figure 1:
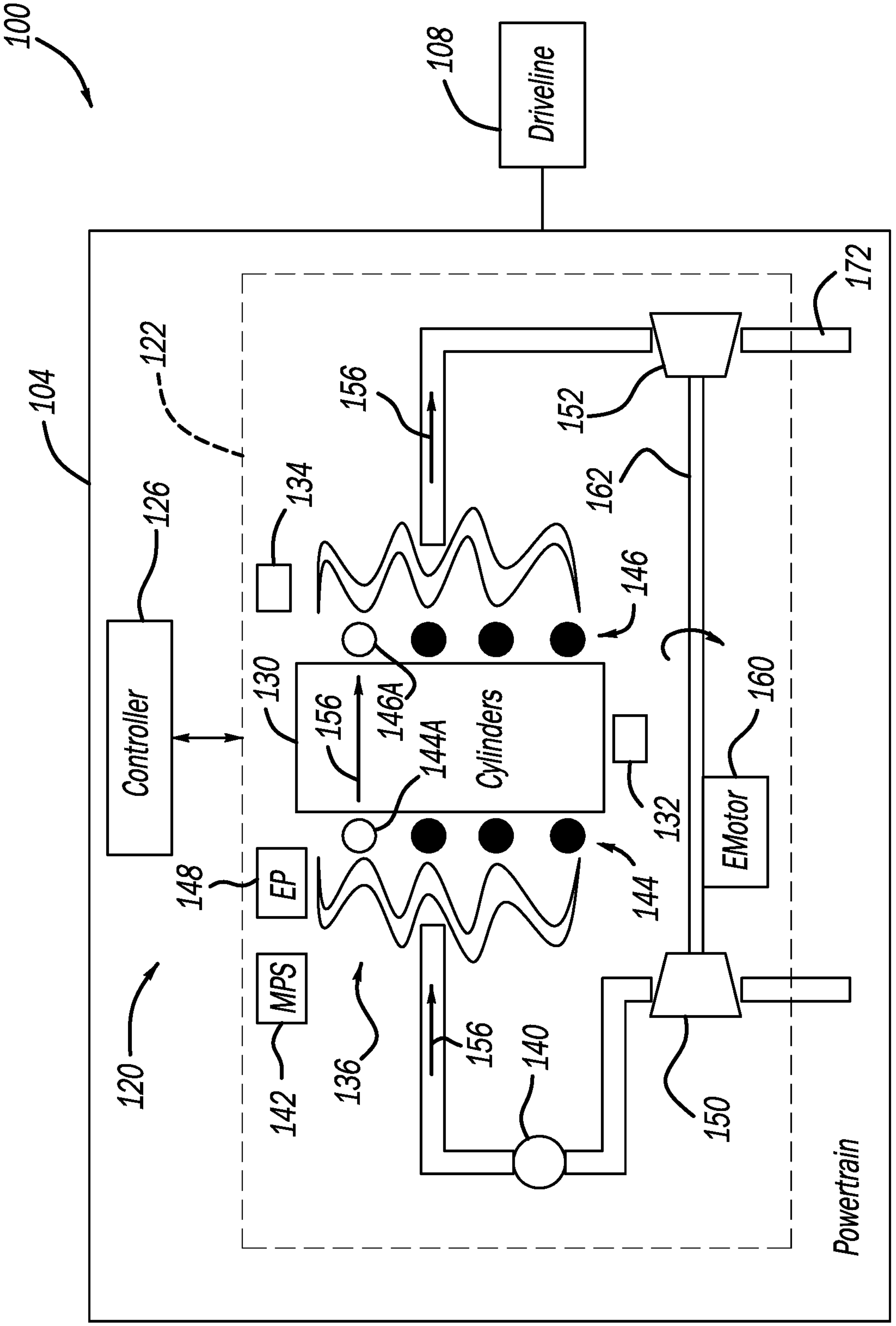
FIG. 1 is a functional block diagram of an engine system including an electronic turbine (hereinafter "eTurbine") and engine or cam phaser (hereinafter "ePhaser") that depletes the manifold before starting the ICE according to the principles of the present application.

Referring now to FIG. 1, a functional block diagram of an example vehicle 100 according to the principles of the present application is illustrated. The vehicle 100 includes powertrain 104 configured to generate and transfer drive torque to a driveline 108 of the vehicle 100 for propulsion. The powertrain 104 generally comprises an engine system 120 including an engine assembly 122 and a controller 126. The engine assembly 122 includes an ICE 130 having a crankshaft 132 and a camshaft 134. The ICE further includes a manifold 136 that selectively communicates air to the ICE 130. A throttle 140 actuates between open, closed and intermediate positions to alter an air amount into the manifold 136. A manifold pressure sensor 142 can measure a pressure of the manifold 136 and communicate a signal to the controller 126 indicative of the measured pressure.

The ICE 130 includes intake valves collectively identified at 144 and exhaust valves collectively identified at 146. The ICE 130 is further equipped with an ePhaser 148. As is known, an ePhaser 148 is configured to adjust the timing of the opening and closing of the intake and exhaust valves 144 and 146. In operation, the ePhaser 148 adjusts a position of the camshaft 134 in relation to the crankshaft 132 in the ICE 130. An ePhaser can be applied to either of the cam shafts (if the vehicle has two camshafts, one for intake, the other for exhaust). In examples the other phaser can be a regular hydraulic phaser system. The engine assembly 122 further includes a compressor 150, a turbine 152 and an electric motor 160. The electric motor 160 rotates a shaft 162 that in turn rotates the compressor 150 and/or the turbine 152.

It will be appreciated that while the engine system 120 is shown having only the ICE, the engine system 120 can also be configured as a hybrid powertrain having one or more electric propulsion motors.

During operation of the engine system 122, the controller 126 sends a signal to the ePhaser 148 to adjust the position of the camshaft 134 (one or both camshafts) in relation to the crankshaft 132 in order to open a corresponding intake valve 144A and exhaust valve 144B creating a pathway for engine air to go from through the intake valve 144A and exhaust valve 144B. It is appreciated while the intake valve 144A and exhaust valve 146A are identified as being both opened, other intake and/or exhaust valves may be opened to create a pathway that allows engine air to be flushed through the ICE 130.

Furthermore, the controller 126 sends a signal to the throttle 140 to close the throttle 140. In addition, the turbine 152 is operated causing a vacuum pump that draws air out of the manifold 136, through the cylinders in the direction indicated by arrows 156 and out an exhaust 172. During normal engine use, the compressor 150 and turbine 152 typically operates in a direction to direct air into the manifold 136 by rotating the shaft 162. In the method of the instant disclosure, the controller 126 sends a signal to the turbine 152 to remove air from the manifold 136. Once the pressure in the manifold 142 reaches a desired threshold, a signal is sent from the controller 126 to the eTurbine 152 to turn off the eTurbine 152 to bring it back to zero revolutions. Thereafter, normal cranking sequence of the ICE 130 starts.

Figure 2:
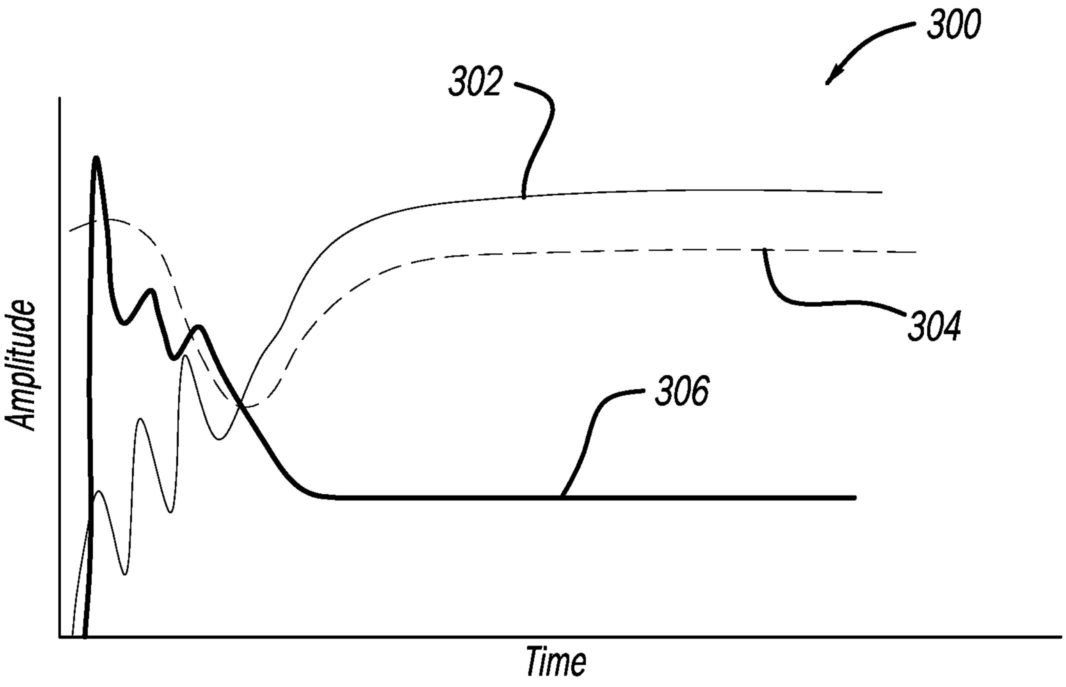
FIG. 2 Prior Art
FIG. 2 is a plot illustrating engine speed, manifold air pressure (MAP) and airflow rate for a conventional ICE at startup according to Prior Art.

Turning now to FIG. 2, a plot 300 illustrating engine speed 302, manifold air pressure (MAP) 304 and airflow rate 306 for a conventional ICE at startup according to Prior Art is shown. As shown, with MAP 304 elevated at startup, airflow rate 306 too is elevated resulting in additional fuel requested at the ICE and excess emissions being created (due to the catalyst not adequately heated up yet). Additionally, engine start experienced at the ICE can be rough adding to unwanted NVH.

Figure 3:
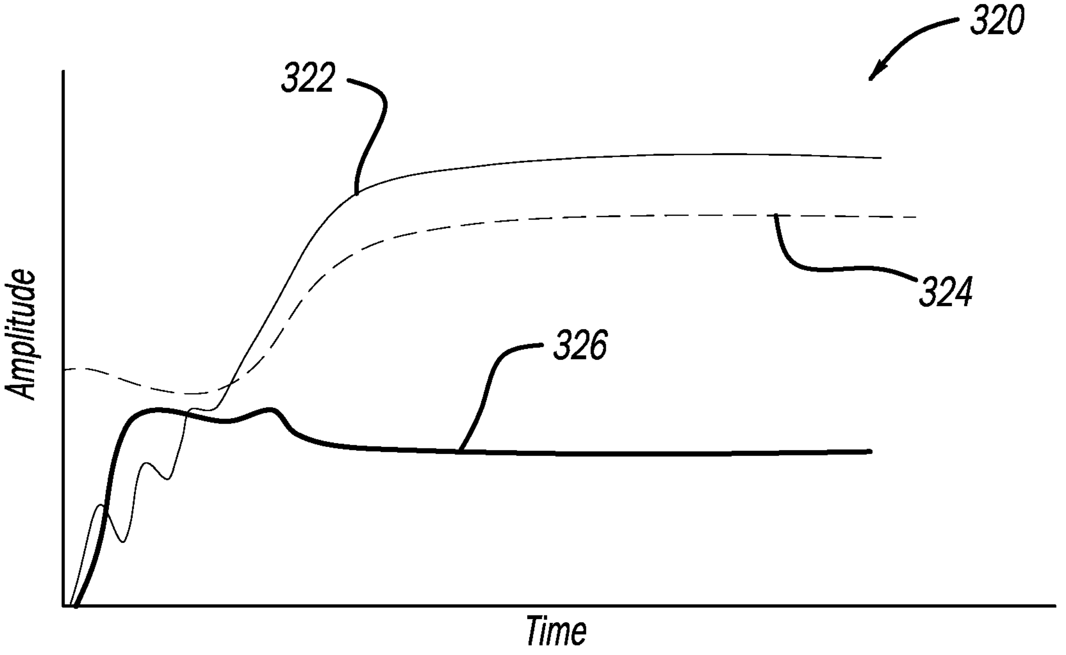
FIG. 3 is a plot illustrating engine speed, manifold air pressure (MAP) and airflow rate for the engine system of FIG. 1 according to the principles of the present application.

With reference to FIG. 3, a plot 320 illustrating engine speed 322, manifold air pressure (MAP) 324 and airflow rate 326 for the engine system 120 according to the principles of the present application is shown. As illustrated, with decreased MAP 324 at startup, a decrease in airflow rate 326 exists. With decreased airflow, decreased fuel is needed and therefore decreased emissions is achieved. Moreover, a smoother start is experienced at the ICE 130 due to a reduced and consistent engine speed 322.

Figure 4:
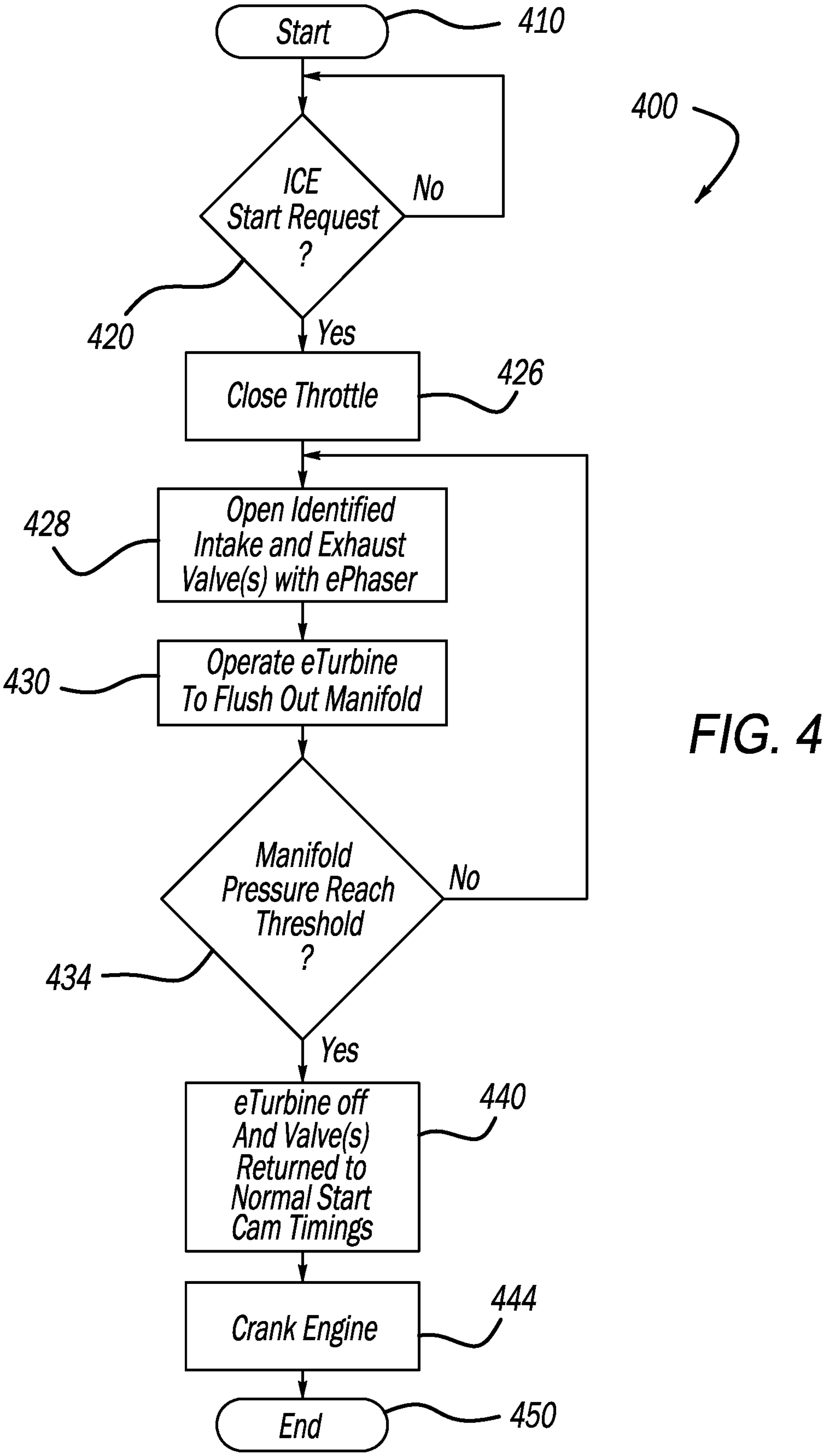
FIG. 4 is a flow chart illustrating a method of operating the engine system of FIG. 1 according to principles of the present application.

With additional reference now to FIG. 4, a method 400 of controlling the engine system 120 according to examples of the present disclosure will be described. The method starts at 410. At 420 control determines whether there has been a key on event. As used herein, a "key on" event refers to an ICE start request. If no key on event has been detected, control loops to 420. If control determines that a key on (or ICE start request) event has been detected, control sends a signal to the throttle 140 to close at 426. At 428, control sends a signal to the ePhaser 148 to open identified intake and exhaust valves (such as intake valve 144A and exhaust valve 146A). At 430, control operates the eTurbine 152 (causing air to flow in the direction 156) to flush out the air in the manifold 136.

At 434, control determines whether the pressure in the manifold 136 has reached a threshold. In examples, the controller 126 can receive a pressure signal from the MPS 142. The threshold can be set to any pressure indicative of a sufficient minimum pressure to satisfy a reduction in emissions. If control determines that the pressure in the manifold 136 has not reached a threshold at 434, control loops to 430. If control determines that the pressure in the manifold 136 has reached the threshold at 434, control turns the eTurbine 152 off and the valves 144A, 146A are returned to a normal start cam timing at 440. At 444 control cranks the ICE 130. Control ends at 450.

In advantages, the vehicle 100 that incorporates the present engine system 120, achieves a decrease in emissions and NVH by depleting the manifold 136 whereas strategies that require variable cams create a restriction to allow less air into the cylinders of the ICE. A significant advantage in the present disclosure is that a vehicle that already uses an eTurbine and ePhaser, there is no extra hardware needed. Instead, the controller 126 is used to operate the e Turbine and ePhaser as needed gaining a significant cost benefit as compared to current solutions.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above.

It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An engine system that delivers torque to a driveline of a vehicle, the engine system comprising:

an internal combustion engine (ICE) having intake valves and exhaust valves;

a manifold that selectively communicates air into the ICE;

an electronic phaser (ePhaser) configured to adjust timing of the intake valves and exhaust valves;

an electric turbine (eTurbine) driven by an electric motor, the eTurbine configured to deliver air toward and away from the manifold; and a controller that determines an ICE start request and, based on the ICE start request, sends a signal to the ePhaser to open identified valves of the intake valves and the exhaust valves creating a pathway through the ICE, and sends a signal to rotate the eTurbine to move air out of the manifold.

2. The engine system of claim 1, wherein the controller is further configured to receive a signal from a manifold pressure sensor indicative of a measured pressure in the manifold, the controller further configured to determine whether the manifold pressure has reached a threshold pressure and stop rotation of the eTurbine based on reaching the threshold pressure.

3. The engine system of claim 2, further comprising a throttle that moves between an open position that allows air to be directed into and out of the manifold, and a closed position that inhibits air from being directed into and out of the manifold.

4. The engine system of claim 3, wherein the controller is further configured to send a signal to the throttle, based on the ICE start request, to move the throttle to the closed position.

5. The engine system of claim 4, wherein the controller is further configured to send a signal to the eTurbine, based on reaching the threshold pressure, to turn off the eTurbine.

6. The engine system of claim 5, wherein the controller is further configured to send a signal to the ePhaser, based on reaching the threshold pressure, to return intake and exhaust valves to a starting position.

7. The engine system of claim 5, wherein the controller is further configured to send a signal to the ICE to crank the ICE, subsequent to turning off the eTurbine.

8. The engine system of claim 1, further comprising a compressor, wherein the electric motor rotates a shaft associated with the compressor and the turbine.

9. The engine system of claim 8, wherein the electric motor and the compressor comprise an electric compressor.

10. A method of operating an engine system that delivers torque to a driveline of a vehicle, the method comprising:

receiving a start request in an engine system having an internal combustion engine (ICE);

sending a signal, based on receiving the start request, to an engine phaser to open identified intake and exhaust valves creating a pathway through the ICE;

sending a signal, based on receiving the start request, to an electric motor to rotate an electric turbine (eTurbine) to move air in a direction out of the manifold thereby creating a vacuum through the pathway in the ICE and moving air out of the manifold;

receiving a signal from a manifold air pressure (MAP) sensor indicative of a measured pressure in the manifold;

determining whether the measured pressure in the manifold satisfies a threshold, the threshold corresponding to a reduced pressure in the manifold suitable to reduce emissions at startup of the ICE;

sending a signal to the electric motor to stop rotating the eTurbine based on the measured pressure satisfying the threshold;

sending a signal to the ePhaser to return the intake and exhaust valves to a start position; and sending a signal, based on the measured pressure satisfying the threshold, to the engine system to crank the ICE.

11. The method of claim 10, further comprising:

sending a signal to a throttle, based on receiving the start request, causing the throttle to move to a closed position.

12. The method of claim 10, wherein sending a signal to an electric motor to rotate the eTurbine comprises rotating a shaft with the electric motor causing the eTurbine to rotate.

13. The method of claim 10, wherein sending a signal to an electric motor to rotate an eTurbine to move air in a direction out of the manifold comprises moving air from the manifold, through the ICE and out of an exhaust.

* * * * *